R. DIXON.
SCRAPER ATTACHMENT FOR BRAKE SHOES.
APPLICATION FILED SEPT. 5, 1917. RENEWED JUNE 21, 1918.
1,274,997.  Patented Aug. 6, 1918.
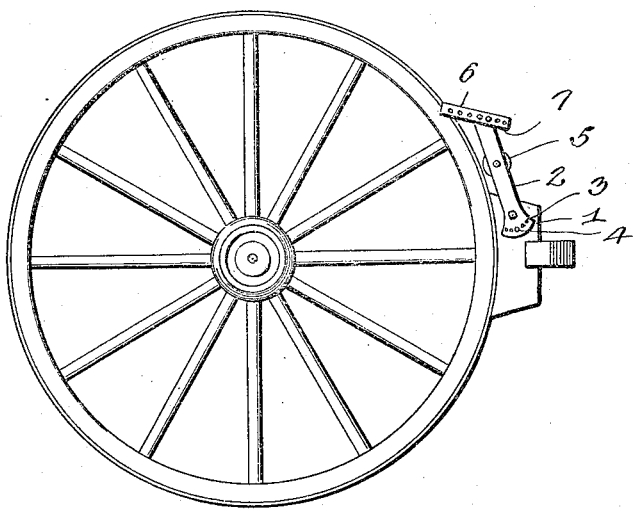
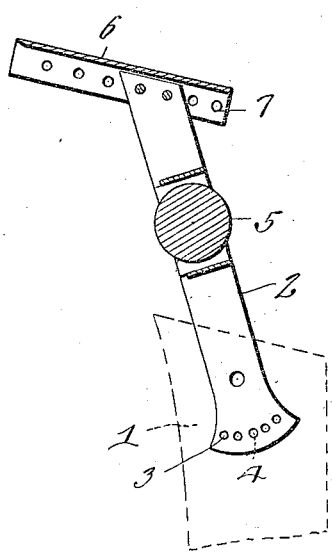
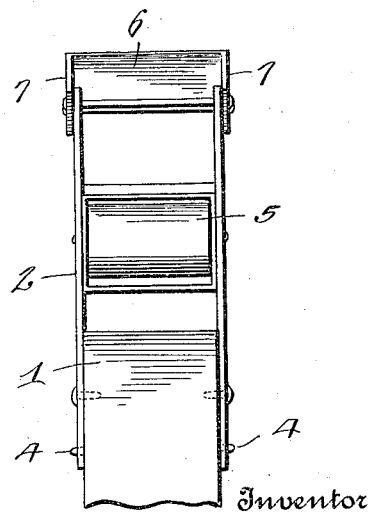
Inventor
R. Dixon,
By Victor J. Evans
Attorney

UNITED STATES PATENT OFFICE.

ROBERT DIXON, OF ARMELLS, MONTANA.

SCRAPER ATTACHMENT FOR BRAKE-SHOES.

1,274,997.      Specification of Letters Patent.      Patented Aug. 6, 1918.

Application filed September 5, 1917, Serial No. 189,814. Renewed June 21, 1918. Serial No. 241,288.

*To all whom it may concern:*

Be it known that I, ROBERT DIXON, a citizen of the United States, residing at Armells, in the county of Fergus and State of Montana, have invented new and useful Improvements in Scraper Attachments for Brake-Shoes, of which the following is a specification.

This invention relates to scraper attachments especially adapted to be applied to a shoe of a wagon brake and it consists in the novel features hereinafter described and claimed.

An object of the invention is to provide an attachment of the character stated which is of simple and durable structure and which may be readily adjusted in order to have the same conform with the periphery of the wheel upon which it operates.

With this object in view the attachment comprises a frame which is adjustably connected with the brake shoe and which carries a roller adapted to bear against the periphery of the wagon wheel. A scraper member is mounted upon the said frame and carries an edge adapted to encounter the periphery of the wagon wheel whereby the mud is removed from the wheel before the brake shoe may have contact with the frame. The said scraper member is provided at its longitudinal edges with flanges adapted to move along the edges of the tire of the wheel and remove mud from the same.

In the accompanying drawings:—

Figure 1 is a side elevation of a wheel showing the shoe in position and the scraper attachment mounted upon the shoe.

The other figures are detailed views of the features of the invention.

As illustrated in the accompanying drawings the shoe 1 is of conventional form and is mounted upon the brake beam in a usual manner. A frame 2 is pivotally mounted at the upper portion of the shoe 1 and the side members of the said frame are provided with series of perforations 3 which may receive pins 4 carried by the shoe 1 whereby the said frame may be secured at an adjusted position upon the shoe. The frame 2 carries at a point between its ends a roller 5 which is adapted to bear against the periphery of the wagon wheel. A scraper member 6 is mounted at the upper end of the frame 2 and is provided with an edge portion which is adapted to bear against the periphery of the wagon wheel. The member 6 is further provided along its longitudinal edges with downwardly disposed flanges 7 which are adapted to lie beyond the edges of the tire of the wagon wheel and which remove the mud from the edges of the tire as the wheel revolves upon its axis.

From the foregoing description taken in conjunction with the accompanying drawing, it will be seen that a scraper attachment of simple and durable structure is provided, and that the same may be readily adjusted to operate upon wagon wheels of different diameter and the device will effectually operate to remove the mud from the periphery of the wheel. Therefore when the brake shoe is applied it bears against the relatively clean portion of the periphery of the wheel and the brake mechanism will not become clogged as a consequence of the accumulation of mud upon the brake shoe. The roller 5 bears against the periphery of the wheel and holds the opposite edge of the scraper member at a proper position with relation to the periphery of the wheel.

Having described the invention what is claimed is:—

1. In combination with a brake shoe and a wheel, a frame mounted upon the shoe, a roller carried by the frame and adapted to bear against the periphery of the wheel and a scraper member mounted upon the frame and adapted to bear against the periphery of the wheel.

2. In combination with a brake shoe and a wheel, a frame pivotally mounted upon the shoe, means for securing the frame at an adjusted position upon the shoe, a roller carried by the frame and adapted to bear against the periphery of the wheel and a scraper member carried by the frame and adapted to bear against the periphery of the wheel.

3. In combination with a wheel and a shoe, a frame mounted upon the shoe, a roller carried by the frame and adapted to bear against the periphery of the wheel, a scraper member mounted upon the frame and having an edge portion adapted to bear against the periphery of the wheel, said scraper member being provided at its edges with flanges adapted to lie beyond the edges of the tire of the wheel.

In testimony whereof I affix my signature.

ROBERT DIXON.

Copies of this patent may be obtained for five cents each, by addressing the "Commissioner of Patents, Washington, D. C."